US006498811B1

(12) United States Patent
Van Der Vleuten

(10) Patent No.: US 6,498,811 B1
(45) Date of Patent: Dec. 24, 2002

(54) LOSSLESS ENCODING/DECODING IN A TRANSMISSION SYSTEM

(75) Inventor: Renatus J. Van Der Vleuten, Eindhoven (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/287,426

(22) Filed: Apr. 7, 1999

(30) Foreign Application Priority Data

Apr. 9, 1998 (EP) ........................................... 98201142

(51) Int. Cl.[7] ................................................ H04B 1/66

(52) U.S. Cl. .................. 375/240; 375/240.12; 386/109; 704/500

(58) Field of Search ................................ 375/259, 295, 375/316, 240.14, 240.12, 240.23, 240; 360/24, 48; 386/46, 95, 96, 104–106, 112, 123, 109, 125; 704/220, 500, 201

(56) References Cited

U.S. PATENT DOCUMENTS 4,903,317 A * 2/1990 Nishihara et al. ........... 382/244
5,541,594 A 7/1996 Huang et al.
5,708,511 A * 1/1998 Gandhi et al. .............. 358/426

FOREIGN PATENT DOCUMENTS

EP 0710928 5/1996 ............. G06T/9/00
EP 0755155 1/1997 ............ H04N/7/34

OTHER PUBLICATIONS

"Lossless Coding for Audio Discs" by Peter Craven and Michael Gerzon, in J.Audio Eng. Soc., vol. 44, No.9, Sep. 1996, pp. 706–718.
J. Audio Eng. Soc., vol. 44, No. 9, pp. 706–719, Sep. 1996, "Lossless Coding for Audio Discs", Peter Craven and Michael Gerzon.
AES Preprint 4621 "Robust Coding of High Quality Audio Signals", Jurgen Koller et al, 103rd AES Convention (New York, US).

* cited by examiner

*Primary Examiner*—Phuong Phu
(74) *Attorney, Agent, or Firm*—Edward W. Goodman

(57) ABSTRACT

In a transmitter digital information signal is lossy encoded to form a lossy encoded signal. The lossy encoded signal is decoded to form a lossy replica signal. The lossy replica signal and the digital information signal are combined to form a first residue signal. The first residue signal is predicted, yielding a first predicted signal. The first predicted signal is losslessly entropy encoded (e.g. adaptive Huffman encoded) to provide a lossless residue signal. Both the lossy signal and the lossless residue signal are transmitted via the transmission medium. In a receiver, the lossy signal and lossless residue are separated. The lossy signal is decoded to form a lossy replica of the digital information signal. The lossless residue signal is entropy decoded (e.g. adaptive Huffman decoder) to form a second residue signal. The second residue signal is predicted, yielding a second predicted signal. The second predicted signal is combined with the lossy representation to reproduce the digital information signal.

17 Claims, 3 Drawing Sheets

LOSSLESS ENCODING/DECODING IN A TRANSMISSION SYSTEM

BACKGROUND OF THE INVENTION

1. Field of the Invention

The invention relates to the field of lossless compression/expansion of digital information.

The invention further relates to a transmitting device for transmitting a digital information signal via a transmission medium, including:

a lossy encoder adapted to compress the digital information signal to a lossy encoded signal, a lossy decoder adapted to expand the lossy encoded signal so as to obtain a replica of the digital information signal, a first signal combination unit adapted to combine the digital information signal and the replica to a first residue signal, a lossless encoder adapted to compress the first residue signal to a lossless encoded residue signal, and a second signal combination unit adapted to combine the lossy encoded signal and the lossless encoded residue signal to a transmission signal for the transmission via the transmission medium.

The invention further relates to a receiving device for receiving a transmission signal, to a method of transmitting a digital information signal via a transmission medium , and to a record carrier obtained by means of the method in accordance with the invention.

2. Description of the Related Art

A transmitting and receiving device of the type defined in the opening paragraphs is known from J. Audio Eng. Soc., Vol. 44, No. 9, pp. 706–719, 1996 September, and the AES preprint 4621 "Robust Coding of High Quality Audio Signals" by Jürgen et al, 103rd AES Convention (New York, US). The known transmitting device is intended for efficiently reducing the bit rate of a digital information signal. An encoded signal thus obtained demands less capacity from a transmission medium during transmission. The known receiving device converts the encoded signal into a copy of the original digital information signal.

SUMMARY OF THE INVENTION

It is an object of the invention to provide a transmitting and/or receiving device which reduces the bit rate of a digital information signal more efficiently.

To this end, a transmitting device in accordance with the invention is characterized in that the lossless encoder includes: a prediction filter for deriving a prediction signal, a signal combination unit for combining the prediction signal and the first residue signal so as to obtain a second residue signal, and an entropy encoder for encoding the second residue signal into the lossless encoded residue signal.

A receiving device in accordance with the invention is characterized in that the lossless decoder includes:

an entropy decoder for decoding the lossless encoded residue signal into a second residue signal, a signal combination unit for combining the second residue signal and a prediction signal into the first residue signal, and a prediction filter for processing the second residue signal so as to form the prediction signal.

A method in accordance with the invention is characterized in that the lossless compression includes the following steps:

deriving a prediction signal, combining the prediction signal and the first residue signal so as to obtain a second residue signal, and encoding the second residue signal into the lossless encoded residue signal.

The invention is based on the recognition that a prediction filter for an entropy encoder is useful only if the frequency spectrum of the signal applied to the prediction filter has a non-uniform distribution. In the known transmitting device, a digital signal is lossy encoded and lossy decoded to a lossy signal. A residue signal is obtained by combining the digital information signal and the lossy signal. It was expected that when use is made of a suitable algorithm, the frequency spectrum of the residue signal would have a uniform distribution. In such a case, the use of a prediction filter for the entropy encoder would not lead to a bit rate reduction. However, in contradistinction to what was expected, Applicant has been found that the frequency spectrum of the residue signal does not have a uniform distribution. As a result of this, in practice, a prediction filter does contribute to a further reduction of the bit rate.

BRIEF DESCRIPTION OF THE DRAWINGS

Those skilled in the art will understand the invention and additional objects and advantages of the invention by studying the description of preferred embodiments below with reference to the following drawings, in which.

DETAILED DESCRIPTION OF THE PREFERRED EMBODIMENTS

Figure 1:
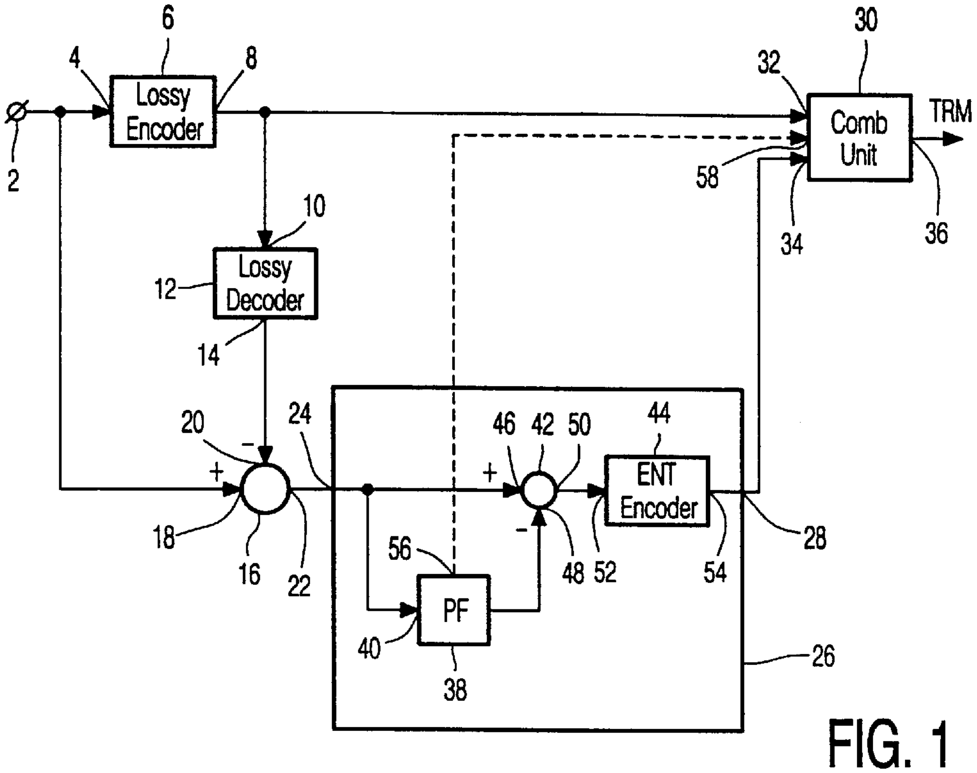
FIG. 1 is a block diagram of a first embodiment of a transmitting device in accordance with the invention.

FIG. 1 shows a first embodiment of a transmitting device in accordance with the invention. The transmitting device has an input terminal 2 for receiving a digital information signal, such as a digital audio signal. The digital audio signal may have been obtained by converting an analog version of the digital audio signal into the digital information signal in an A/D converter. The digital information signal may take the form of 1-bit signals, such as a bit stream. The input terminal 2 is coupled to the input 4 of a lossy encoder 6. The lossy encoder 6 is adapted to convert a digital signal received at the input 4 into a lossy encoded signal for application to an output 8 of the lossy encoder 6. The lossy encoder 6 may take the form of a common filter bank encoder as used in subband coding or transform coding. The lossy encoder 6 may include a perception model. The perception model determines the permissible noise as a function of the frequency. The signal is quantized in such a manner that the quantization noise remains below the mask threshold. As a result of the coarser quantization of the signal, the signal is compressed. The lossy encoder 6 has an output 8 coupled to an input 10 of a lossy decoder 12. The lossy decoder 12 is adapted to decode the lossy encoded signal into a replica of the digital information signal for application to the output 14 of the lossy decoder 12.

A first signal combination unit 16 has a first input 18 coupled to the input terminal 2, a second input 20 coupled to the output of the lossy decoder 12, and an output 22. The first signal combination unit 16 is adapted to combine the input signal with the replica so as to form a first residue signal, and to supply the first residue signal to the output 22. The first signal combination unit 16 can take the form of a subtracter circuit, the signal received at the second input 20 being subtracted from the signal received at the first input 18.

The output 22 of the first signal combination unit is coupled to the input 24 of a lossless encoder 26. The lossless encoder is adapted to encode the signal received at the input 24 into a lossless encoded residue signal, for application to an output 28, in such a manner that the signal received at the input can be reconstructed from the lossless encoded residue signal without any deviations by a suitable decoder.

A second signal combination unit 30 has a first input 32 coupled to the output 8 of the lossy encoder 6, a second input 34 coupled to the output 28 of the lossless encoder 26, and an output 36. The second signal combination unit 30 is adapted to combine the signals received at the first and the second inputs into a transmission signal for transmission via a transmission medium TRM.

A first embodiment of the lossless encoder 26 includes a prediction filter 38, a third signal combination unit 42, and an entropy encoder 44. Prediction filters and entropy encoders are generally known in the art. The prediction filter 38 is coupled to the input 24 of the lossless encoder 26. The third signal combination unit has a first input 46 coupled to the input 24 of the lossless encoder 26, a second input 48 coupled to the prediction filter 38 and an output 50 coupled to an input 52 of the entropy encoder 44. The third signal combination unit 42 is adapted to combine the signals received at the inputs 46 and 48 into a signal for application to the output 50. In the present example, the signal combination unit 42 may be a subtracter circuit. The entropy encoder 44 has an output 54 coupled to the output 28 of the lossless encoder 26. The entropy encoder 44 may be a Huffman encoder.

The prediction filter 38 may be a filter having fixed coefficients or an adaptive prediction filter. In the second case, the prediction filter will generate filter coefficients. In a forward adaptive prediction filter, the coefficients must be transmitted via the transmission medium TRM. The transmitted coefficients then control a corresponding adaptive prediction filter in a receiver to be described hereinafter. If the prediction filter 38 takes the form of an adaptive prediction filter, it also has an output 56 coupled to another input 58 of the second signal combination unit 30. The prediction filter 38 is adapted to apply the filter coefficients to the second signal combination unit 30. The second signal combination unit 30 is now further adapted to transmit the coefficients via the transmission medium TRM. In a backward adaptive prediction filter, the filter coefficients are not transmitted. An adaptive prediction filter in the receiving device described hereinafter is then adapted to derive the filter coefficients from a signal derived from the input signal of the prediction filter.

The transmitting device as described hereinbefore operates as follows. The digital information signal is applied to the input terminal 2 and is supplied to the lossy encoder 6. The lossy encoded signal has a significantly lower bit rate and contains insufficient information for the reconstruction of the original signal. The lossy encoded signal is applied to the lossy decoder 12, which converts the lossy encoded signal into a replica of the digital information signal. Subsequently, the first signal combination unit 16 subtracts the replica from the digital information signal yielding a first residue signal. The lossless encoder 26 processes the first residue signal so as to form the lossless encoded residue signal. The lossless encoded residue signal has a lower bit rate than the first residue signal. A corresponding lossless decoder can identically reconstruct the first residue signal from the lossless encoded residue signal.

A person skilled in the art would expect the amplitude of the first residue signal to have a uniform frequency spectrum. This person also would know that the use of a prediction filter for the entropy encoder 44 does not lead to a reduction of the bit rate of the signal at the output of the entropy encoder 44 if the applied signal has a uniform power spectrum. However, further examination of the signal at the output 22 of the first signal combination unit 16 has led to the insight that this signal does not have a uniform frequency spectrum. Therefore, the use of a prediction filter does result in a further reduction of the bit rate.

The prediction filter 38 in the lossless encoder serves to determine a prediction signal for the first residue signal received at the input 24 of the lossless encoder 26. The prediction signal includes at least the frequency of the first residue signal having the largest energy content. The signal combination unit 42 subtracts the prediction signal from the first residue signal received at the input 24 of the lossless encoder 26. This results in the second residue signal appearing at the output 50 of the signal combination unit 42. The entropy encoder 44 converts the second residue signal into the lossless encoded residue signal. Preferably, the entropy encoder 44 takes the form of a Huffman encoder. The prediction filter serves to minimize the energy content of the second residue signal. The bit rate of the lossless encoded residue signal will decrease, accordingly, as the energy content of the second residue signal decreases.

The prediction filter can take the form of an adaptive filter. In that case, the filter makes an estimate of, each time, a portion of the first residue signal. On the basis of the information of a portion of the first residue signal or the second residue signal the filter calculates the setting of the coefficients for which the energy content of the second residue signal is minimal. As a result of this, the energy content of the second residue signal will decrease further with respect to a signal obtained using a prediction filter having fixed coefficients. The filter applies the calculated coefficients, or a representation thereof, to an input 58 of the second signal combination unit 30.

In the second signal combination unit 30, the signals received at the inputs are combined into the transmission signal. An associated receiving device, described hereinafter, can exactly reconstruct the digital information signal from the transmission signal. For the transmission of a digital information signal without any loss of information using the transmitting device, a lower bit rate is obtained than by using a device which includes only a lossless encoder. A transmission medium has a maximum bit rate or bandwidth. When the transmission of the digital information signal by means of a transmitting device which includes only a lossless encoder would yield the maximum bit rate, then a transmitting device in accordance with the invention will require a lower bit rate. Thus, the transmitting device in accordance with the invention can transmit more information per unit of time if use is made of the maximum bit rate of the transmission medium.

The transmission medium can be a transmission channel or a record carrier, such as magnetic or an optical record carrier. The transmission signal is transmitted to a receiving device via the transmission medium TRM.

Figure 2:
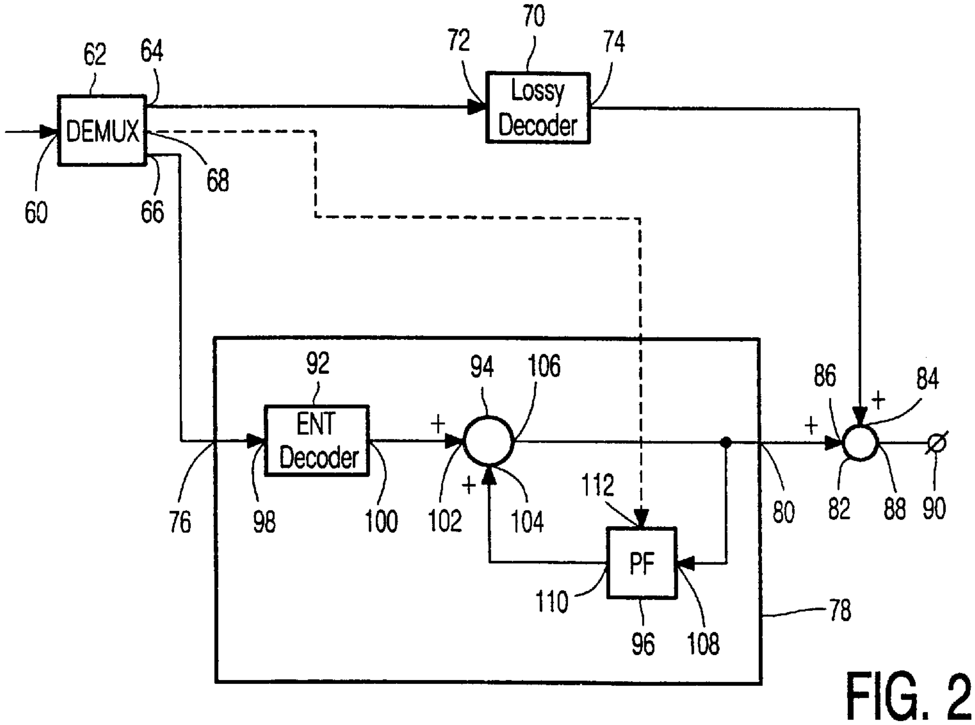
FIG. 2 is a block diagram of a first embodiment of a receiving device in accordance with the invention.

FIG. 2 shows an embodiment of a receiving device for receiving a transmission signal. The receiving device derives an exact replica of the original signal from the received transmission signal.

The transmission signal TRM is received at an input 60 of a demultiplexing unit 62. The demultiplexing unit 62 derives a lossy encoded signal and a lossless encoded residue signal from the transmission signal TRM. The lossy encoded signal is applied to a first output 64. The lossless encoded residue signal is applied to a second output 66.

The first output 64 of the demultiplexing unit 62 is coupled to an input 72 of a lossy decoder 70. The lossy decoder is adapted to expand the signal received at the input 72 into a replica of the digital information signal. This replica is not exactly identical to the original digital information signal. The replica is applied to an output 74 of the lossy decoder 70.

The second output 66 of the demultiplexing unit 62 is coupled to a input 76 of a lossless decoder 78. The lossless decoder 78 is adapted to expand the signal received at the input 76 into a residue signal. The residue signal is applied to an output 80 of the lossless decoder 78.

A signal combination unit 82 has a first input 84 coupled to the output 74 of the lossy decoder 70, a second input 86 coupled to the output 80 of the lossless decoder 78, and an output 88. The signal combination unit 82 is adapted to combine a signal received at the first input 84 and a signal received at the second input 86, so as to form a copy of the digital information signal. The copy is applied to the output 88. The signal combination unit 82 may be an adder circuit, the signal received at the second input 86 being added to the signal received at the first input 84. The sum signal is supplied to the output 88. The output 88 is coupled to an output terminal 90 of the receiving device.

The receiving device shown in FIG. 2 operates as follows. The demultiplexing unit 62 splits the transmission signal received at input 60 into a lossy encoded signal and a lossless encoded residue signal. In the lossy encoder 70, the lossy encoded signal is converted into a replica of the digital information signal. The replica exhibits deviations with respect to the original digital information signal, which has been encoded and transmitted by a transmitting device as shown in FIG. 1. In the lossless decoder 78, the lossless encoded residue signal is converted into a residue signal. This residue signal corresponds to the deviations between the replica and the original digital information signal. By adding the replica and the residue signal to one another in the signal combination unit 82, a copy of the digital information signal is obtained. In the ideal case, this copy is an exact copy of the digital information signal.

An example of the lossless decoder 78 includes an entropy decoder 92, a signal combination unit 94 and a prediction filter 96. The lossless encoder 78 has its input 76 coupled to an input 98 of the entropy decoder 92. The entropy decoder, for example, a Huffman decoder, is adapted to decode the signal received at the input 98 into a predicted residue signal, and to apply the predicted residue signal to an output 100 of the entropy decoder. The signal combination unit 94 has a first input 102 coupled to the output 100 of the entropy decoder 92. The entropy decoder 92 has a second input 104 coupled to the output 100 of the prediction filter 96. The signal combination unit 94 is adapted to combine the signals received at the first input 102 and the second input 104 and to supply this signal to the output 106 of the signal combination unit 94. In the present example, the signal combination unit may be an adder circuit. The prediction filter 96 has an input 108 coupled to the output 106 of the signal combination unit 94. The prediction filter 96 in the lossless decoder serves to determine a prediction signal of the residue signal received at the input 108. The prediction filter is adapted to supply the prediction signal to the output 110. The lossless decoder 78 has its output 80 coupled to the output 106 of the signal combination unit 94.

The prediction filter 96 can include an adaptive filter. In that case, the filter is intended to make an estimate of, each time, a portion of the residue signal. The prediction filter requires coefficients in order to give the filter the proper filter characteristic. If the receiving device includes a forward adaptive prediction filter, the demultiplexing unit is further adapted to extract the filter coefficients, as generated by a forward adaptive prediction filter 38 of the transmitting device, from the transmission signal, and to supply these to the output 68. This output is coupled to the input 112 of the prediction filter 96. In the case that the receiving device includes a backward adaptive prediction filter, the prediction filter is adapted to derive threshold filter coefficients from a signal derived from the input signal.

Figure 3:
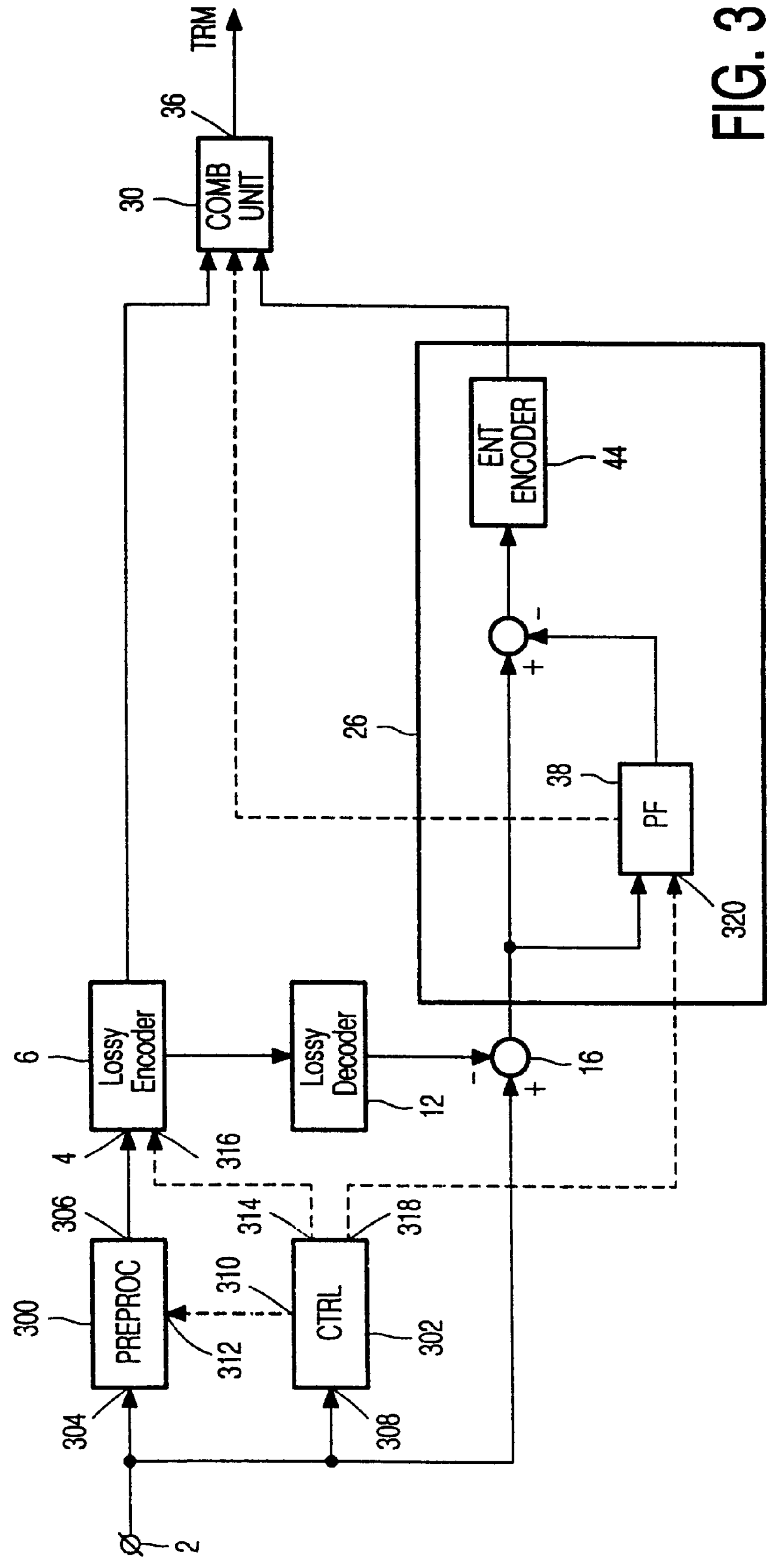
FIG. 3 is a block diagram of a second embodiment of a transmitting device in accordance with the invention.

FIG. 3 shows a modification of the embodiment of a transmitting device as shown in FIG. 1. The embodiment further includes a preprocessing filter 300 and a control unit 302. The transmitting device has its input 2 coupled to an input 304 of the preprocessing filter 300 and to an input 308 of the control unit 302. The preprocessing filter 300 has its output 306 coupled to the input 4 of lossy encoder 6. The control unit 302 has a first control output 310 coupled to a control input 312 of the preprocessing filter 300. A second control output 314 is coupled to a control input 316 of the lossy encoder. A third control output 318 is coupled to a control input 320 of the prediction filter 38.

The control unit 302 is adapted to generate a first, a second and a third control signal, and to apply these signals to the first control output 310, the second control output 314 and the third control output 318, respectively. The values of the control signals depend on the signal received at the input 308.

The preprocessing filter 300 is adapted to process the signal received at the input 304 and subsequently apply it to the output 306 of the preprocessing filter 300. Depending on the control signal received at the input 312, the preprocessing filter 300 has certain characteristics, for example, filter characteristics, maximum rise time and fall time of the outgoing signal.

The embodiment shown in FIG. 3 is based on the recognition of the following fact. It is known that the bit rate of some signals is not reduced to a significant extent by a lossy encoder. It is also known for which signals the bit rate can be reduced to a satisfactory extent. The same is also known for lossless encoders. A transmitting device in accordance with the invention employs a lossy encoder 6 and a lossless encoder 26. A digital information signal applied to the input 2 of this transmitting device is transmitted via a transmission medium TRM in a lossless manner, i.e., without any loss of information. Thus, a portion of the transmission signal consists of lossy data and another portion of lossless data, The reduction of the bit rate achieved by the transmitting device is determined by the sum of the lossy data bits and the lossless data bits in relation to the bit rate of the digital information signal received at the input 2. The embodiment as shown in FIG. 2 generates a transmission signal in which the ratio between the amounts of lossy data and lossless data depends on the signal received at the input 2. In the embodiment shown in FIG. 3, the digital information signal is evaluated. It is examined which components in the digital information signal cause a poor signal compression of the lossy encoder 6. The preprocessing filter 300 is now set so as to reduce the effect of these components in the preprocessed signal applied to the output 306. The lossy encoder can efficiently convert the preprocessed signal into a lossy encoded signal. The lossy signal has a low bit rate in relation to the digital information signal. If the lossy encoder has a plurality of perception models, the perception model providing the highest signal compression can be selected via the second control signal from the control unit 302.

The preprocessing filter 300 and the lossy encoder 6 are set in such a manner that the bit rate of the lossy encoded signal is lower than the bit rate of the lossy signal without the preprocessing filter 300. The lossy decoder 12 decodes the lossy encoded signal to a replica of the digital information signal. In the first signal combination unit 16, the replica is subtracted from the digital information signal so as to form a first residue signal. Since the preprocessing filter 300 has removed the components which cause the poor signal compression of the lossy encoder 6, these components will be present in the first residue signal. As a result of this, the lossy encoded signal will have a lower bit rate. The first residue signal will now, on average, have a greater absolute value than the first residue signal in a transmitting device in accordance with the embodiment shown in FIG. 1. The frequency spectrum of the first residue signal will be non-uniform and will not correspond to the white noise spectrum. In this case, the use of a prediction filter 38 will result in a reduction of the bit rate of the lossless signal at the output of the entropy encoder 44. The third control signal from the control unit 302 ensures that the setting of the prediction filter 44 is optimized so as to make the power distribution of the second residue signal as uniform as possible. In the case of a uniform amplitude distribution, the best reduction is achieved with a normal PCM coding. However, PCM coding is a special form of Huffman coding, which is obtained by selection of the correct table in the entropy encoder 44. In the embodiment shown in FIG. 3, the control unit 302 ensures that as few as possible hard-to-compress signals are applied to the lossy encoder. As a result of this, the bit rate of the lossy encoded signal will decrease, no matter how, while the bit rate of the lossless signal will not increase or will increase to a smaller extent. As a result of this, the bit rate of the transmission signal is further reduced on average.

Figure 4:
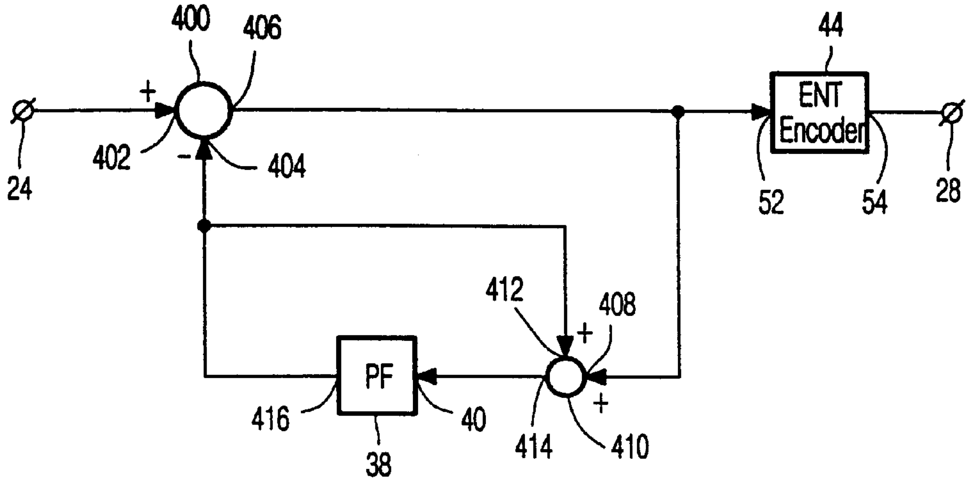
FIG. 4 is a block diagram of a second example of a lossless encoder.

FIG. 4 shows a second example of the lossless encoder 26 of FIG. 1. The lossless encoder has its input 24 coupled to a first input 402 of a first signal combination unit 400. The first signal combination unit 400 has its second input 404 coupled to an output 416 of a prediction filter 38. A second signal combination unit 410 has a first input 408 coupled to the output 406 of the first signal combination unit 400. The second signal combination unit 410 has its second input 412 coupled to an output 416 of the prediction filter 38. The prediction filter 38 has its input 40 coupled to the output 414 of the second signal combination unit 410. The entropy encoder 44 has its input 52 coupled to the output 406 of the first signal combination unit 400. The lossless encoder has its output 28 coupled to the output 54 of the entropy encoder 44.

When the prediction filter 38 and the entropy encoder 44 in the second example of the lossless encoder are respectively identical to the prediction filter 38 and the entropy encoder 44 in the first example of FIG. 1, it appears that in the case of similar input signals at the input 24, the same signals are produced at the output 28. The type of lossless encoder used in the invention is not limited to the types given as examples. Another type may be chosen for other than functional reasons.

Figure 5:
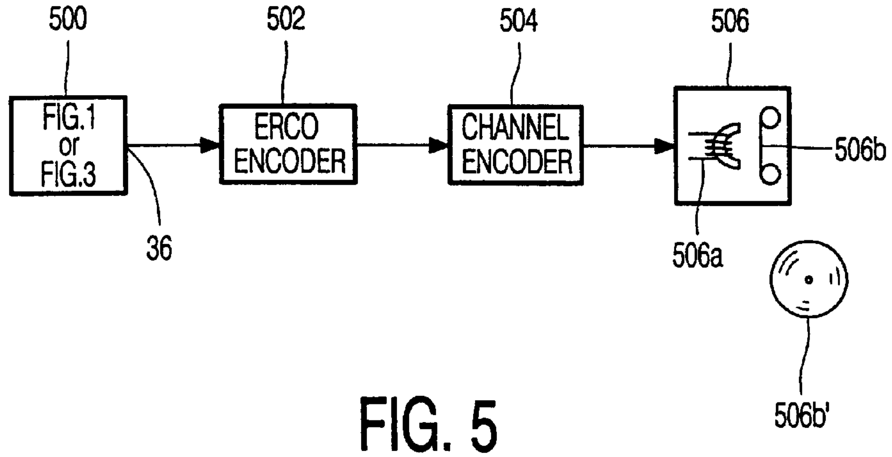
FIG. 5 is a block diagram of a transmitting device in the form of a recording apparatus.

FIG. 5 shows a transmitting device for recording the digital information signal on a record carrier. The circuit block 500 in FIG. 5 takes the place of the block diagram of FIG. 1 or FIG. 3. The output 36 of the circuit block 500 is identical to the output 36 of the combining unit 30 in FIG. 1 or 3. The recording apparatus further includes an error correction encoding unit 502, a channel encoding unit 504, and a recording unit 506 for recording the signal on the record carrier **506*b*. The error correction unit and the channel encoding unit are generally known. The record carrier 506*b* can be of the magnetic type. In the present case, the recording unit 506 includes one or several magnetic heads 506*a* adapted to record the information in a track on the record carrier 506*b*. In another embodiment, the record carrier is an optical information carrier 506*b*'. In that case, the recording unit 506 includes an optical recording head 506*a* for recording the information in a track on the record carrier 506*b*'**.

Figure 6:
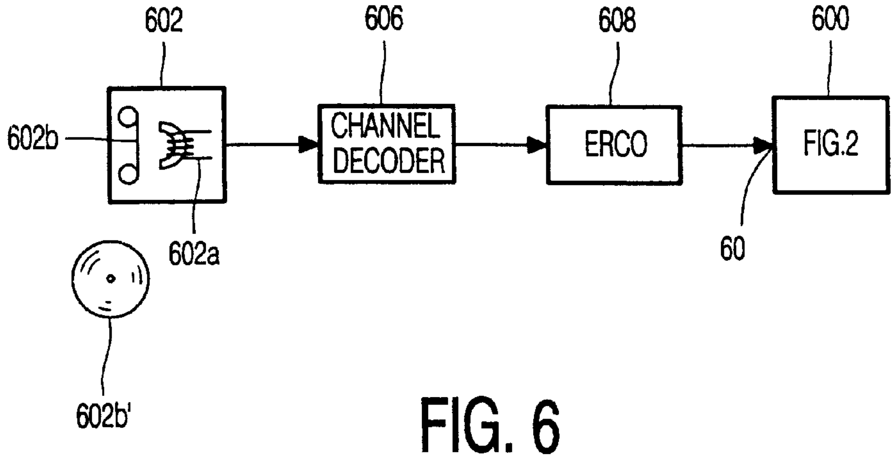
FIG. 6 is a block diagram of a receiving device in the form of a reproducing apparatus.

FIG. 6 shows a receiving device for reproducing the digital information signal on the record carrier. The circuit block 600 in FIG. 6 takes the place of the block diagram of FIG. 2. The input 60 of the circuit block 600 corresponds to the input 60 of the demultiplexing unit 62 in FIG. 2. The reproducing apparatus further includes a read unit 602, a channel decoding unit 606, and an error correction unit 608 for the detection and, if possible, correction of errors in the signal. The channel decoding unit and the error correction unit are generally known from the prior art. The read unit 602 is adapted to read the signal recorded on the record carrier **602*b*, and to supply the read signal to a channel decoder 606. The record carrier 602*b* can be of the magnetic type. In which case, the read unit 602 includes one or several magnetic read heads 602*a* for reading the information from a track on the record carrier 602*b*. In another embodiment, the record carrier 602*b* is an optical record carrier 602*b*'. In which case, the read unit 602 includes an optical read head 602*a* for reading the information from a track on the record carrier 602*b*'**.

An apparatus in accordance with the invention may include both a transmitting device and a receiving device. The combination of the apparatus shown in FIG. 5 and FIG. 6 yields an apparatus for recording a digital information signal on the record carrier, and later the recorded digital information signal can be read from the record carrier and reproduced at a later instant. Another possibility is that two apparatuses, which each include both a transmitting and receiving device, communicate with one another via one or several transmission media. The transmitting device of the first apparatus transmits a digital information signal to the second apparatus via a first transmission medium. The receiving device of the second apparatus receives this signal and transfers it to the output. In a similar manner, the second apparatus can transmit a digital information signal to the first apparatus via a second transmission medium. Depending on the physical implementation of the transmission medium, one or more transmission media may be used.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the appended claims.

What is claimed is:

1. A transmitter for transmitting a digital information signal via a transmission medium, said transmitter comprising:

lossy encoder means for compressing a digital information signal to form a lossy encoded signal;

lossy decoder means for expanding the lossy encoded signal to form a lossy replica of the digital information signal;

a first signal combination unit for combining the digital information signal and the lossy replica to form a first residue signal;

lossless encoder means for compressing the first residue signal to form a lossless encoded residue signal;

a second signal combination unit for combining the lossy encoded signal and a lossless encoded residue signal to form a transmission signal; and means for transmitting the transmission signal via a transmission medium, wherein the lossless encoder means comprises:

prediction filter means for deriving a prediction signal;

a third signal combination unit for combining the prediction signal and the first residue signal to form a second residue signal; and entropy encoder means for encoding the second residue signal to form the lossless encoded residue signal.

2. The transmitter as claimed in claim 1, wherein the prediction filter means derives the prediction signal from the first residue signal.

3. The transmitter as claimed in claim 1, wherein the entropy encoder means includes a Huffman encoder.

4. The transmitter as claimed in claim 1, wherein the prediction filter means provides the prediction signal such that when combined with the first residue signal in the third signal combination means, the second residue signal has, on average, a flat frequency spectrum.

5. The transmitter as claimed in claim 1, wherein the means for transmitting comprises means for recording the transmission signal on a record carrier.

6. The transmitter as claimed in claim 1, wherein said transmitter further comprises:

an error correction encoding unit and/or a channel encoding unit.

7. The transmitter as claimed in claim 1, wherein the means for transmitting comprises means for recording the transmission signal on an optical or a magnetic recording medium.

8. A receiver comprising:

receiving means for receiving a transmission signal from a transmission medium;

demultiplexing means for extracting a lossy encoded signal and a lossless encoded residue signal from the transmission signal;

lossy decoder means for expanding the lossy encoded signal to form a lossy replica of a digital information signal;

lossless decoder means for expanding the lossless encoded residue signal to form a first residue signal; and a signal combination unit for combining the lossy replica of the digital information signal and the first residue signal to form the digital information signal, wherein the lossless decoder means comprises:

an entropy decoder for decoding the lossless encoded residue signal into a second residue signal;

a further signal combination unit for combining the second residue signal and a prediction signal to form the first residue signal; and a prediction filter for processing the first residue signal to form the prediction signal.

9. The receiver as claimed in claim 8, wherein the entropy decoder includes a Huffman decoder.

10. The receiver as claimed in claim 8, wherein the receiving means comprises means for reproducing the transmission signal having been recorded on a record carrier.

11. The receiver as claimed in claim 10, wherein the receiving means further comprises a channel decoding unit and/or an error correction unit for processing the reproduced transmission signal.

12. A method for transmitting a digital information signal via a transmission medium, said method comprising the steps:

receiving a digital information signal;

compressing the digital information signal in a lossy fashion to form a lossy encoded signal;

expanding the lossy encoded signal to form a replica of the digital information signal;

combining the digital information signal and the replica of the digital information signal to form a first residue signal;

compressing the first residue signal in a lossless fashion to form a lossless encoded residue signal; and combining the lossy encoded signal and the lossless encoded residue signal to form a transmission signal for transmission via the transmission medium, wherein the step of compressing the first residue signal comprises the sub-steps:

deriving a prediction signal;

combining the prediction signal and the first residue signal to form a second residue signal; and encoding the second residue signal to form the lossless encoded residue signal.

13. The method as claimed in claim 12, wherein the prediction signal is derived from the first residue signal.

14. The method as claimed in claim 12, wherein:

the prediction signal is derived from the first residue signal; and the transmission signal is stored on a record carrier.

15. A record carrier produced by the method as claimed in claim 12, wherein the record carrier is an optical or a magnetic recording medium.

16. A record carrier produced by the method as claimed in claim 14, wherein the record carrier is an optical or a magnetic recording medium.

17. An apparatus comprising:

lossy encoder means for compressing a first digital information signal to form a first lossy encoded signal;

lossy decoder means for expanding the first lossy encoded signal to form a first lossy replica of the first digital information signal, and for expanding a second lossy encoded signal to form a second lossy replica of a second digital information signal;

prediction filter means for deriving one or more prediction signals;

signal combination means for combining the first digital information signal and the first lossy replica to form a first residue signal, for combining one of the prediction signals and the first residue signal to form a second residue signal, for combining the first lossy encoded signal and a first lossless encoded residue signal to form a first transmission signal, for combining a third residue signal and one of the prediction signals to form a fourth residue signal, and for combining the second lossy replica and the fourth residue signal to reproduce a second digital information signal;

entropy encoder means for encoding the second residue signal to form the first lossless encoded residue signal;

transmitting means for transmitting the first transmission signal on a first transmission medium;

receiving means for receiving a second transmission signal from a second transmission medium;

demultiplexing means for extracting the second lossy encoded signal and a second lossless encoded residue signal from the second transmission signal; and entropy decoder means for decoding the second lossless encoded residue signal to form the third residue signal.

* * * * *

UNITED STATES PATENT AND TRADEMARK OFFICE

CERTIFICATE OF CORRECTION

PATENT NO. : 6,498,811 B1
DATED : December 24, 2002
INVENTOR(S) : Renatus J. Van Der Vleuten It is certified that error appears in the above-identified patent and that said Letters Patent is hereby corrected as shown below:

Title page,
Item [73], Assignee, change "Phillips" to -- Philips --.

Signed and Sealed this

Twenty-fifth Day of March, 2003

JAMES E. ROGAN
*Director of the United States Patent and Trademark Office*